May 5, 1970  W. E. JAMES  3,509,912
VALVE
Filed Oct. 30, 1967
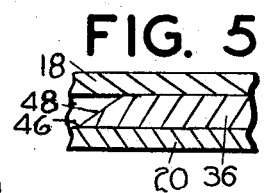
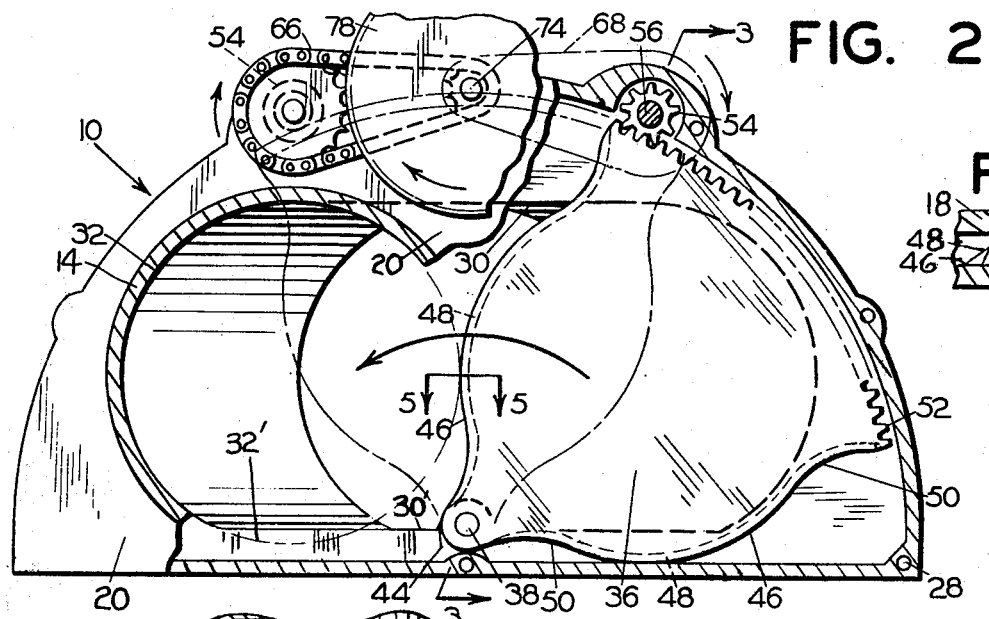
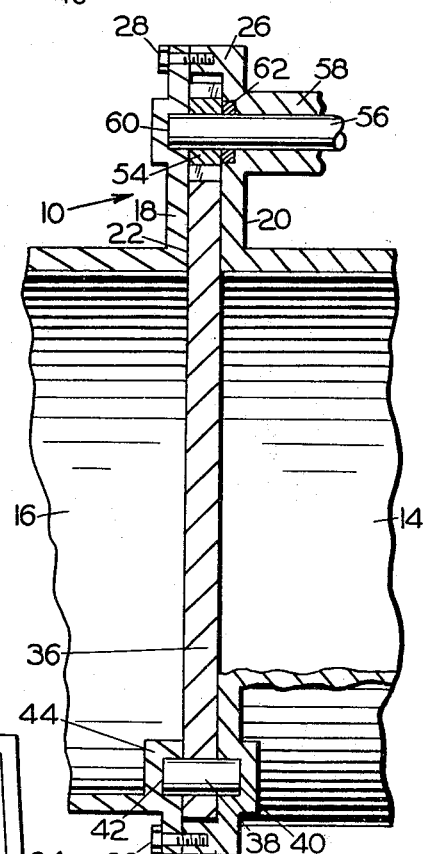
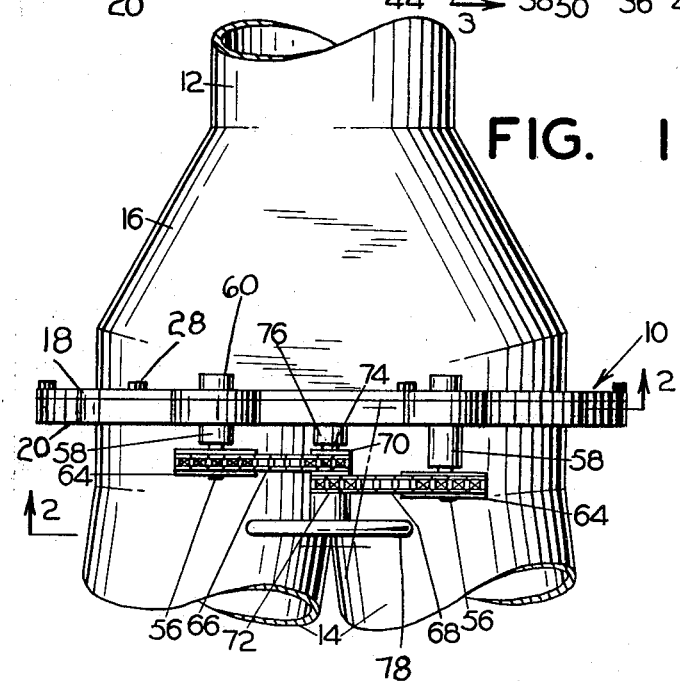
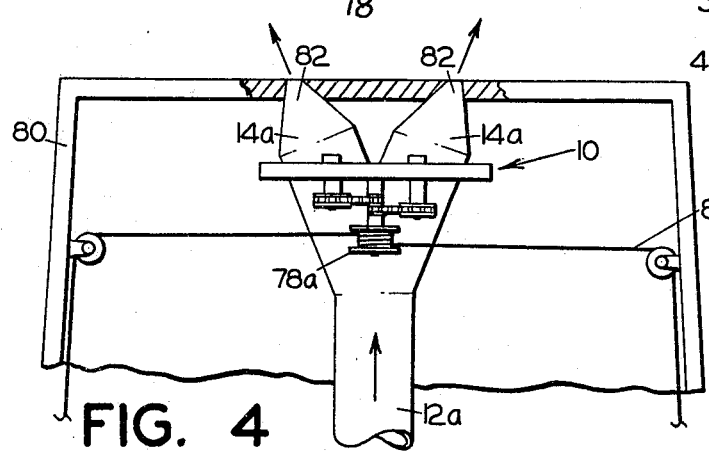
INVENTOR.
WILLIAM E. JAMES
BY Eugene M. Echelman
ATTORNEY

United States Patent Office 3,509,912
Patented May 5, 1970

3,509,912
VALVE
William E. James, 2005 NE. 51st Ave.,
Portland, Oreg. 97213
Filed Oct. 30, 1967, Ser. No. 678,903
Int. Cl. F17d 1/00
U.S. Cl. 137—610                               8 Claims

ABSTRACT OF THE DISCLOSURE

The valve is of a type intended for use with a pair of branch pipes and is arranged to direct the flow through one or the other of such pipes or to meter the flow simultaneously therethrough. The valve includes a housing having a single pipe inlet and dual or branch outlets. A platelike gate member is pivotally mounted in the housing to control the flow of fluid through the branch pipes. The gate has rack teeth on one end engageable by pinion wheels for driving it between valving positions. The side edges of the gate are tapered into knife edges, and furthermore such side edges have cut-out portions into which solids may move to allow pivotal adjustment of the gate member in valving operations thereof. The bottom edge of the outlets in the housing is slightly lower than the bottom edge of the inlet to cause a turbulence in the fluid passing through the housing, thus allowing only a minimum of solid or semi-solid material in the fluid from lodging in the housing.

---

This invention relates to new and useful improvements in valve structures and particularly pertains to a valve arranged to control the flow of fluid through a pair of branch pipes.

In many operations wherein fluid flows from a main pipe to a pair of branch pipes, it is desired that the volume of flow be controlled through such branch pipes. In some cases it is desired that the flow through one branch pipe be completely stopped while the flow through the other branch pipe be unimpeded. Valves heretofore used for such purpose have not been completely successful in controlling the flow therein because the types of gates used in the valves allow slurries and solids to pack above the gate and impede the free movement of such gate. The present invention employs a valve mechanism which operates efficiently even though slurries or solids exist in the solution being moved. Thus, this valve makes it possible to effectively use branch pipes in dredging operations in that instead of closing down the pumping operation while one of the branch lines is being shifted, the latter can be fully closed off and flow directed through the other branch line.

It is the primary objective of the present invention to provide a valve mechanism having a novel arrangement of structure facilitating efficient operation thereof and being capable of controlling the flow of fluid through a pair of branch pipes. Such valve may completely close off one branch pipe while leaving the other open for full flow or it may meter the flow partially through both branch pipes at the same time.

Another object of the invention is to provide a valve of the type described employing a novel housing and a novel movable gate therein.

More particular objects of the present invention are to provide a valve housing which includes a gate member pivotally mounted in the housing and arranged to pivot from one side to the other for selectively controlling the flow of fluid through a pair of branch pipes leading from the housing; to provide such gate member with knife edges on opposite sides thereof to cut through any solids or semi-solids which may be in the way; and furthermore to provide cut-out portions on such knife edges which permit solid or semi-solid material to move thereinto and allow free movement of the gate.

Still another object is to provide a valve structure employing a housing having inlet and outlet openings with a controlling gate member therebetween, the bottom of the outlet opening and the bottom of the inlet opening being in different planes to cause a turbulence in the fluid passing through the housing and thus tend to prevent solids or semi-solids from becoming lodged in the housing.

Still another object is to provide a valve structure having a pivoted gate member and including in combination with such gate member a novel drive means for moving it to various positions of pivoted adjustment.

The invention will be better understood and additional objects and advantages will become apparent from the following description taken in connection with the accompanying drawings which illustrate a preferred form of the device.

FIG. 1 is a top plan view of the present valve mechanism and showing such valve mechanism incorporated in a main inlet pipe having a pair of branch outlet pipes;

FIG. 2 is a cross sectional view enlarged with relation to FIG. 1 and taken on the line 2—2 of said figure;

FIG. 3 is a fragmentary sectional view, also enlarged with relation to FIG. 1, such view being taken on the line 3—3 of FIG. 2;

FIG. 4 is a fragmentary plan view of a jet type boat showing the present valve mechanism as a part of the jet and steering mechanism; and FIG. 5 is an enlarged sectional view taken on the line 5—5 of FIG. 2.

With reference first to FIGS. 1, 2 and 3, and particularly to FIG. 1, the present valve housing is designated generally by the numeral 10 and is intended for use in a pipe line or the like comprising a main or inlet pipe 12 which divides into a pair of branch or outlet pipes 14. For the purpose of the present invention, the main pipe 12 is flared or enlarged at 16 in order that the outlet of the main pipe into the housing has substantially the same shape and size as the two branch pipes 14 as will be described in greater detail hereinafter.

The housing 10 has front and rear walls 18 and 20, respectively, disposed in parallel spaced relation forming an inner area or slot 22 further defined and enclosed by a bottom wall 24 and an arcuate upper wall 26 which forms top and side walls. For the purpose of assembly, upper wall 26 and botom wall 24 may comprise a flanged portion of a rear wall 20 and the front wall 18 may be removably secured thereto, as by stud screws 28.

With greater particularity to the size and shape of the inlet and outlet openings into the housing 10, reference is made to FIG. 2. In this figure, the inlet opening from the flared portion 16 of the inlet pipe is designated by the numeral 30 and comprises an oval shaped, uninterrupted opening from side to side. The rear wall of the housing has individual openings 32, and these two openings are laterally spaced from each other with a portion of the rear wall 20 extending vertically therebetween.

Although the outer dimension and shape of the inlet opening 30 is of substantially the same as the two outlet openings 32 combined, the bottom edge 30' thereof is disposed a slight distance above the bottom edge 32' of the outlet opening. Such difference in elevation causes a turbulence in the fluid flowing through the housing and such turbulence tends to prevent solids or semi-solids from becoming lodged in said housing.

As best apparent in FIG. 3, the space 22 between the front and rear walls 18 and 20, respectively, is rather narrow and such space comprises a working slot for a gate or plate member 36. Gate 36 is pivotally connected at its lower end to the bottom of the housing 10 by means of a pin 38 supported at one of its ends in a socket 40 formed in the rear wall 20 and a socket 42 formed in a lug 44 extending integrally from the bottom edge 30' of the inlet opening 30. By means of the pivotal connection of the gate 36 it is arranged to swing to positions in front of either outlet opening 32. Furthermore, such gate is dimensioned and arranged such that in two side positions thereof it is capable of fully closing off one or the other of the outlet openings 32 while permitting full flow through the other. It is to be understood, however, that the gate can as well be pivoted to intermediate positions to selectively meter the flow through both outlet openings 32.

In a preferred construction, the gate 36 has side edges 46 which generally lead in divergent relation from the pivot point 38. The defining side edges of the gate are tapered at 48 to form knife edges 46, FIGS. 2 and 5. Such tapered portions are provided on the forward side of the gate so that the knife edges sweep along the interior of the housing at the outlet side thereof. Such knife edges, being adjacent to rear wall 20 of the housing serve to keep the inner surface of the rear wall scraped clean at all times. Such allows the gate to seat snugly against the rear wall 20 and maintain a fluid tight connection. Such knife edges also are capable of slicing through any solids which may possibly build up on the bottom wall of the housing, although such build-up of solids is kept to a minimum by the turbulence created by the difference in the height of the bottom edges 30' and 32' of the inlet and outlet openings, respectively.

To even insure to a greater extent that the gate will operate efficiently even though some solids should build up on the bottom wall of the housing, the side edges 46 of such gate have inwardly contoured or cut-out portions 50 into which solids may move when a respective one of the edges 46 approaches the bottom wall of the housing.

The end of the gate opposite from the pivot end is arcuate, having the same radius of curvature as the defining upper wall 26. This end of the gate terminates in rack teeth 52 engageable by a pair of spaced pinions 54 keyed or otherwise secured to shafts 56 journaled in bosses 58 forming an integral part of the rear wall 20. The ends of shafts 56 are also journaled in sockets 60 formed in the front wall 18. In order to prevent escape of fluid through the bosses 58, seals 62 are provided between the shafts and the bosses.

Shafts 56 project rearwardly from their bosses 58 and each has a sprocket wheel 64 keyed or otherwise secured thereto. These sprocket wheels have a drive connection with respective chains 66 and 68 in turn having meshing engagement with sprocket wheels 70 and 72, respectively, keyed or otherwise secured to a central shaft 74 journaled in a boss 76 on the housing 10. Shaft 74 has a hand wheel 78 thereon for operating the drive mechanism for the gate 36.

Sprocket wheels 64 are of identical size and tooth ratio, as are sprocket wheels 70 and 72 and pinion gears 54 to provide uniform drive of the said pinion gears 54. The two pinion gears 54 are also arranged such that one of them will pick up the leading end of the rack teeth 52 on the gate before the other is disengaged therefrom. Thus, the gate will always be engaged by at least one of the pinion gears.

Fluid flow is adapted to be controlled through a pair of branch lines wherein if necessary one branch line may be closed off completely while the other branch line receives full flow. Such arrangement facilitates efficient usage and a saving of man hours in areas of pumping where a line must be moved or changed frequently. In using the present invention, when it is necessary to change a branch line, the line to be moved is merely closed off by the valve means and the fluid flow directed through the other branch line. As stated hereinbefore, it is also possible by means of the present valve mechanism to direct a metered flow through the two branch lines simultaneously. That is, identical volume of fluid flow can be made to occur in the two pipes or a ratio volume of flow can be made to occur by suitable manipulation of the gate.

The gate will operate smoothly along the inner surface of the rear wall 20 since the knife edge 46 keeps such surface scraped clean, and furthermore if any solid or semi-solid material should become lodged in the housing such gate is capable of cutting through it by reason of the knife edges 46. Further, it may not be necessary for the knife edges to cut any solid or semi-solid material which may become lodged in the housing since such material can move into the cut-out portions of the blades. A sealing engagement of the gate against the rear wall 20 is accomplished by fluid pressure on the forward surface of the said gate.

The present valve mechanism may have many different applications one of which is in conjunction with dredge lines as described and another of which may be in conjunction with a jet type boat 80, FIG. 4. In such latter application, the inlet pipe 12a is connected to a suitable pump, not shown, and diverging branch lines 14a project through the outer wall of the boat. In order to produce a jet type action, the outlet ends 82 are reduced to nozzle size. Instead of the hand wheel 78, a pulley 78a is secured on the shaft 74 and is operated by boat steering lines 84. The gate 36 in such boat drive structure serves as steering means in that with the branch pipes 14a disposed in divergent relation selected fluid flow through the nozzles 82 serves to impart direction of travel.

It is to be understood that the form of my invention herein shown and described is to be taken as a preferred example of the same and that various changes in the shape, size and arrangement of parts may be resorted to without departing from the spirit of my invention. For example, while the invention is particularly useful in controlling the flow of fluid through a pair of branch pipes, it could as well serve as an on-off valve in a housing having a single outlet pipe 14.

Having thus described my invention, I claim:

1. A valve assembly comprising
   (a) an inlet pipe,
   (b) an outlet pipe,
   (c) a housing having front, rear, bottom, top and side walls,
   (d) means in said front wall defining an inlet opening for receiving fluid from the inlet pipe,
   (e) means in said rear wall defining an outlet opening for admitting fluid to the outlet pipe,
   (f) an upstanding plate-like gate pivotally attached at its lower end to said housing on an axis extending longitudinally of the direction of flow and having swinging movement laterally across said outlet opening,
   (g) said gate means being arranged such that in a pivotal adjusting movement thereof it selectively controls the flow of fluid through said outlet opening, and
   (h) drive means engageable with an upper portion of said gate means pivotally adjusting the latter laterally.

2. The valve mechanism of claim 1 including
   (a) means in said housing defining a recess extending laterally over the top of said housing and down the sides,
   (b) the upper portion of said gate extending into said recess and having free guided movement therein in its lateral pivotal adjusting movement.

3. The valve mechanism of claim 1 including
   (a) means in said housing defining a recess extending laterally over the top of said housing and down the sides,
   (b) the upper portion of said gate extending into said recess and having free guided movement therein in its lateral pivotal adjusting movement,
(c) said drive means being engageable with a portion of said gate which is disposed in said recess.

4. The valve mechanism of claim 1 including
(a) means in said housing defining a recess extending laterally over the top of said housing and down the sides,
(b) the upper portion of said gate extending into said recess and having free guided movement therein in its lateral pivotal adjusting movement,
(c) said gate having an arcuate upper edge,
(d) gear teeth on said upper edge,
(e) said drive means comprising a pinion mounted in said housing and engageable with said gear teeth for adjustably moving said gate laterally on its pivot.

5. The valve mechanism of claim 1 wherein
(a) said rear wall has a pair of said outlet openings for admitting fluid to a pair of branch types,
(b) means in said housing defining a recess extending laterally over the top of said housing and down the sides,
(c) the upper portion of said gate extending into said recess and having free guided movement therein in its lateral pivotal adjusting movement,
(d) one surface of said gate extending closely adjacent to a rear defining wall of said recess whereby fluid pressure against said gate seals the latter against said defining wall at said outlet openings,
(e) said gate means being dimensioned and arranged to control the flow of fluid through said pair of outlet openings.

6. The valve mechanism of claim 1 including
(a) means in said housing defining a recess extending laterally over the top of said housing and down the sides,
(b) the upper portion of said gate extending into said recess and having free guided movement therein in its lateral pivotal adjusting movement,
(c) said gate having a pair of side edges leading in divergent relation from the pivotal connection of said gate with the housing,
(d) at least one of said side edges being tapered to form a knife edge slidably engaged with a rear defining wall of said recess for scraping and cutting solids from said rear defining wall.

7. The valve mechanism of claim 1 wherein
(a) said gate has a pair of side edges leading in divergent relation from the pivotal connection of said gate with the housing,
(b) at least one of said side edges having a recess portion therein to receive any build-up of solids lodged in the housing between the said one edge of the gate and the bottom wall when said gate is pivotally moved toward said bottom wall.

8. The valve mechanism of claim 1 wherein the bottom edges of said inlet and outlet openings are in different planes to produce a turning action of fluid within the housing and assist any solids in the fluid to pass through the housing.

References Cited

UNITED STATES PATENTS

| | | | |
|---|---|---|---|
| 362,610 | 5/1887 | Collins | 137—610 |
| 1,671,069 | 5/1928 | De Wein | 137—609 X |
| 1,851,034 | 3/1932 | Blatter | 137—610 |
| 2,334,181 | 11/1943 | Elston | 137—610 X |
| 2,624,364 | 1/1953 | Detlefsen | 137—609 |
| 2,993,513 | 7/1961 | Hyde | 137—610 X |
| 3,080,884 | 3/1963 | Nelson et al. | 137—612 X |
| 3,132,477 | 5/1964 | Egger | 137—609 X |
| 3,190,584 | 6/1965 | Gire et al. | 137—610 X |

JAMES KEE CHI, Primary Examiner